US009201146B2

(12) United States Patent
Beyon et al.

(10) Patent No.: US 9,201,146 B2
(45) Date of Patent: Dec. 1, 2015

(54) AIRBORNE DOPPLER WIND LIDAR POST DATA PROCESSING SOFTWARE DAPS-LV

(71) Applicant: The United States of America as represented by the Administrator of the National Aeronautics and Space Administration, Washington, DC (US)

(72) Inventors: Jeffrey Y. Beyon, Yorktown, VA (US); Grady J. Koch, Yorktown, VA (US); Michael J. Kavaya, Yorktown, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 78 days.

(21) Appl. No.: 14/079,965

(22) Filed: Nov. 14, 2013

(65) Prior Publication Data
US 2015/0253430 A1 Sep. 10, 2015

Related U.S. Application Data

(60) Provisional application No. 61/865,155, filed on Aug. 13, 2013.

(51) Int. Cl.
*G01S 17/95* (2006.01)
(52) U.S. Cl.
CPC ...................................... *G01S 17/95* (2013.01)
(58) Field of Classification Search
CPC .................................. G01P 5/26; G01C 3/08
USPC ..................................................... 356/28, 28.5
See application file for complete search history.

(56) References Cited

U.S. PATENT DOCUMENTS

| | | | |
|---|---|---|---|
| 7,311,000 B2 | 12/2007 | Smith et al. | |
| 7,499,181 B2 | 3/2009 | Mirand et al. | |
| 7,827,861 B2 | 11/2010 | LaWhite et al. | |
| 2010/0014066 A1* | 1/2010 | Becker et al. | 356/28 |

OTHER PUBLICATIONS

Koch, Grady J., et al., "Three-dimensional Wind Profiling of Offshore Wind Energy Areas with Airborne Doppler Lidar," Journal of Applied Remote Sensing, 2014, pp. 083662-1-083662-11, vol. 8.

(Continued)

*Primary Examiner* — Luke Ratcliffe
(74) *Attorney, Agent, or Firm* — Andrea Z. Warmbier

(57) ABSTRACT

Systems, methods, and devices of the present invention enable post processing of airborne Doppler wind LIDAR data. In an embodiment, airborne Doppler wind LIDAR data software written in LabVIEW may be provided and may run two versions of different airborne wind profiling algorithms. A first algorithm may be the Airborne Wind Profiling Algorithm for Doppler Wind LIDAR ("APOLO") using airborne wind LIDAR data from two orthogonal directions to estimate wind parameters, and a second algorithm may be a five direction based method using pseudo inverse functions to estimate wind parameters. The various embodiments may enable wind profiles to be compared using different algorithms, may enable wind profile data for long haul color displays to be generated, may display long haul color displays, and/or may enable archiving of data at user-selectable altitudes over a long observation period for data distribution and population.

15 Claims, 8 Drawing Sheets

(56) References Cited

OTHER PUBLICATIONS

Kavaya, Michael J., et al., "The DAWN Airborne, Wind-Profiling, Coherent-Detection Lidar System, Overview, Flight Results, and Plans," Journal of Atmospheric and Oceanic Technology, Apr. 2014, pp. 826-842, vol. 31.

Beyon, Jeffrey Y., et al., "Airborne Wind Profiling Algorithms for the Pulsed 2-Micron Coherent Doppler Lidar at NASA Langley Research Center," Proc. of SPIE, SPIE Defense, Security, and Sensing 2013, Apr. 29-May 3, 2013, pp. 87310K-1-87310K-7, vol. 8731.

Yu, Jirong, et al., "1 J/pulse Q-switched 2 um Solid-State Laser," Optics Letters, Feb. 15, 2006, pp. 462-464, vol. 31, No. 4.

Beyon, Jeffrey Y., et al., "Noise Whitening in Airborne Wind Profiling with a Pulsed 2-Micron Coherent Doppler 5 Lidar at NASA Langley Research Center," Proc. of SPIE, Laser Radar Technology and Application XVII, Apr. 23, 2012, pp. 83790N-1-83790N-7, vol. 8379, Baltimore, MD.

Beyon, Jeffrey Y., et al., "Development of the Data Acquisition and Processing System for a Pulsed 2-Micron Coherent Doppler Lidar System," Proc. of SPIE, Lidar Remote Sensing for Environmental Monitoring XI, Oct. 11, 2010, pp. 78600A-1-78600A-6, vol. 7860, Incheon, Republic of Korea.

Beyon, Jeffrey Y., et al., "Noise Normalization and Windowing Functions for VALIDAR in Wind Parameter Estimation," Proc. of SPIE, Laser Radar Technology and Applications XI, 2006, pp. 621404-1-621404-11, vol. 6214.

Koch, Grady J., et al., "Field Testing of a High-Energy 2-um Doppler Lidar," Journal of Applied Remote Sensing, Mar. 2, 2010, pp. 1-13, vol. 4.

Vermeesch, Kevin, et al., "Comparisons of Ground-Based, Radiosonde, and Aircraft Wind Measurements at the Howard University Beltsville Research Campus," Working Group on Space-Based Lidar Winds Meeting, Jun. 16-19, 2009, pp. 1-18, Wintergreen, VA.

Beyon, Jeffrey Y., et al., "Comparison of Theoretical and Empirical Statistics of Wind Measurements with Validation Lidar (VALIDAR)," Proc. of SPIE, Signal Processing, Sensor Fusion, and Target Recognition XVII, 2008, pp. 69681N-1-69681N-11, vol. 6968.

Beyon, Jeffrey Y., et al., "Novel Nonlinear Adaptive Doppler-Shift Estimation Technique for the Coherent Doppler Validation Lidar," Optical Engineering, Jan. 2007, pp. 016002-1-016002-10, vol. 46(1).

Beyon, Jeffrey Y., et al., "Signal Processing Techniques for Heterodyne Differential Absorption Lidar," Proc. of SPIE, Signal Processing, Sensor Fusion, and Target Recognition XVI, 2007, pp. 65671N-1-65671N-8, vol. 6567.

Koch, Grady J., et al., "High-Energy 2 um Doppler Lidar for Wind Measurements," Optical Engineering, Nov. 2007, pp. 116201-1-116201-14, vol. 46(11).

Beyon, Jeffrey Y., et al., "Novel Nonlinear Adaptive Doppler Shift Estimation Technique (NADSET) for the Coherent Doppler Lidar System Validar" Proc. of SPIE, Signal and Data Processing of Small Targets, 2006 pp. 623601-1-623601-9, vol. 6236.

Beyon, Jeffrey Y., et al., "Resolution Study of Wind Parameter Estimates by a Coherent Doppler Lidar System," Proc. of SPIE, Laser Radar Technology and Applications XI, 2006, pp. 621403-1-621403-8, vol. 6214.

Beyon, Jeffrey Y., et al., "Wind Profiling by a Coherent Doppler Lidar System VALIDAR with a Subspace Decomposition Approach," Proc. of SPIE, Signal and Data Processing of Small Targets, 2006, pp. 623605-1-623605-8, vol. 6236.

Beyon, Jeffrey Y., et al., "Airborne Wind Profiling with the Data Acquisition and Processing System for a Pulsed 2-Micron Coherent Doppler Lidar System," SPIE Defense, Security and Sensing 2012, Apr. 23-27, 2012, pp. 1-8, Baltimore, MD.

Beyon, J.Y., et al., "Data Acquisition and Processing System for Airborne Wind Profiling with a Pulsed, 2-Micron, Coherent-Detection, Doppler Lidar System," 2010 Earth Science Technology Forum, Jun. 22-24, 2010, pp. 1-4, Arlington, VA.

Grady J. Koch, "Doppler Lidar Observations of an Atmospheric Thermal Providing Lift to Soaring Ospreys," NASA Technical Paper 20080015449, pp. 1-12.

\* cited by examiner

AIRBORNE DOPPLER WIND LIDAR POST DATA PROCESSING SOFTWARE DAPS-LV

CROSS-REFERENCE TO RELATED PATENT APPLICATIONS

This patent application claims the benefit of and priority to U.S. Provisional Patent Application Ser. No. 61/865,155, filed on Aug. 13, 2013. This application is also related to co-pending U.S. patent application Ser. No. 14/079,914, titled "Airborne Wind Profiling Algorithm for Doppler Wind Lidar," filed on Nov. 14, 2013. The foregoing applications are incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Light Detection and Ranging ("LIDAR") is a sensing technology using light pulses (e.g., light from a laser) to determine a distance to objects. Doppler Wind LIDAR systems use light pulses to generate measurements of wind fields in the atmosphere based on the characteristics of the reflected light pulses returned from aerosols suspended in the atmosphere. For example, Doppler Wind LIDAR systems may calculate the distance to aerosols suspended in the atmosphere based on the time difference between transmitting a light pulse or signal and receiving the reflection of that light pulse or signal and/or may calculate the velocity of the aerosols suspended in the atmosphere based on the frequency shift between a transmitted light pulse or signal and a received reflected light pulse or signal. The measurements generated by Doppler wind LIDAR systems may be used to generate wind profiles and other models providing information about the atmosphere.

Current data acquisition and processing software for Doppler wind LIDAR systems is focused on processing during airborne missions and requires long development times to implement or try new algorithms. With the focus on real time data and providing results during missions, current data acquisition and processing software for Doppler wind LIDAR systems uses simple processing algorithms and merely archive output data products to files. Because of this need for the data and program architecture to be optimized in order to keep up with the high-speed data acquisition and processing rate, there is limited scalability in the current real time system. The optimization process takes time, and it needs to be done for every new addition to the real time version. Quite often, the requirement and the user specifications change without advance notice during the development of a new module. In general, the development time in C is longer when compared to the development time in LabVIEW.

Additionally, the current software uses only a basic visual display in order to maximize the data acquisition rate and data throughput. The selection of displays in real-time version written in C is very limited. To develop a new one, the development time can be too long to be implemented in time for the next field operation. Development of new data product displays in the current real time system in general requires a long time and often requires reorganization of the entire program architecture due to hardware control constraints.

The current software also runs on an aircraft based system in real time, which means that the software is not available for updating, testing, and data processing when the aircraft is on a mission, such as NASA's Genesis and Rapid Intensification Process ("GRIP") hurricane mission. Also, to date there has been no GRIP data processing software for NASA's Doppler Aerosol Wind LIDAR ("DAWN").

Further, the current software makes Doppler wind LIDAR data processing airborne wind LIDAR data possible for only a small part of the algorithm with limited capabilities in non-scientific software. This may cause users to resort to other software for processing which does not meet the requirements of data processing and display.

BRIEF SUMMARY OF THE INVENTION

The systems, methods, and devices of the present invention enable post processing of airborne Doppler wind LIDAR data with enhanced data analysis and enable enhanced data analysis techniques. In an embodiment, airborne Doppler wind LIDAR data software written in LabVIEW may be provided and may ran two versions of different airborne wind profiling algorithms. A first algorithm may be the Airborne Wind Profiling Algorithm for Doppler Wind LIDAR ("APOLO") using airborne wind LIDAR data from two orthogonal directions to estimate wind parameters, and a second algorithm may be a five direction based method using pseudo inverse functions to estimate wind parameters. The various embodiments may enable wind profiles to be compared using different algorithms, may enable wind profile data for long haul color displays to be generated, may display long haul color displays, and/or may enable archiving of data at user-selectable altitudes over a long observation period for data distribution and population.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
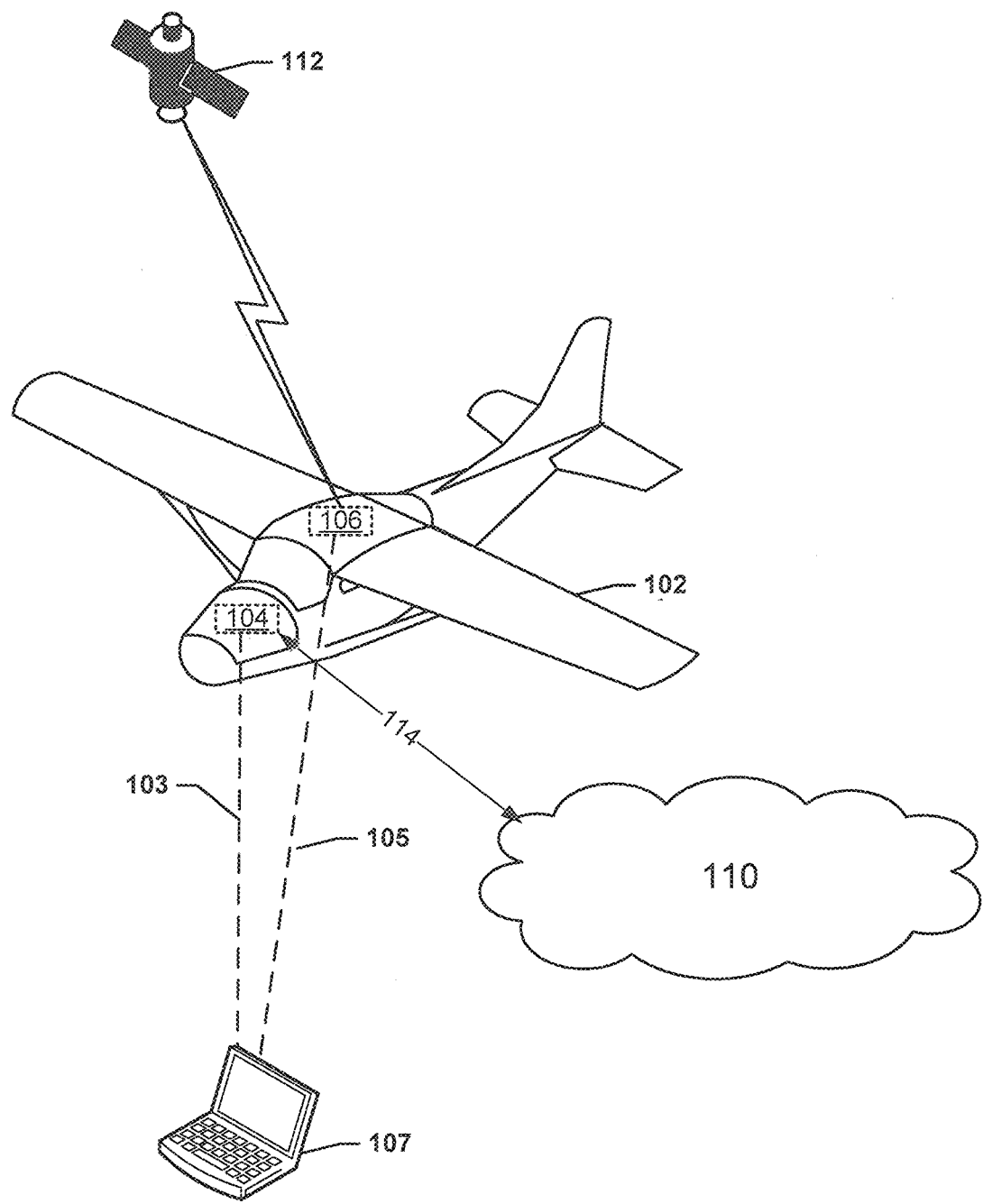
FIG. 1 is system block diagram of an example airborne Doppler Wind LIDAR system suitable for use with the various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The systems, methods, and devices of the present invention enable post processing with enhanced data analysis and enable enhanced data analysis techniques. In an embodiment, airborne Doppler wind LIDAR data software written in LabVIEW may process NASA's Genesis and Rapid Intensification Process ("GRIP") hurricane mission data for NASA's Doppler Aerosol Wind LIDAR ("DAWN"). In this manner, DAWN data may be used to provide wind profile analysis results from the GRIP data to the GRIP committee. In an embodiment, airborne Doppler wind LIDAR data software written in LabVIEW may be provided and may run two versions of different airborne wind profiling algorithms. A first algorithm may be the Airborne Wind Profiling Algorithm for Doppler Wind LIDAR ("APOLO") using airborne wind LIDAR data from two orthogonal directions to estimate wind parameters, and a second algorithm may be a five direction based method using pseudo inverse functions to estimate wind parameters. The various embodiments of airborne Doppler wind LIDAR data software written in LabVIEW may enable wind profiles to be compared using different algorithms, for example in side by side displays of results using different algorithms. Additionally, the various embodiments of airborne Doppler wind LIDAR data software written in LabVIEW may enable wind profiles generated using various algorithms, such as APOLO and/or a five direction based algorithm, to be compared to dropsonde data, for example in a side by side display and/or an overlay display. In an embodiment, the data products from the various algorithms and the dropsonde data may be in different altitude and resolutions and the airborne Doppler wind LIDAR data software written in LabVIEW may intelligently merge the different altitudes and resolutions to enable comparison of the data. The various embodiments of airborne Doppler wind LIDAR data software written in LabVIEW may enable wind profile data for long haul color displays to be generated and may display long haul color displays over a long observations period. The various embodiments of airborne Doppler wind LIDAR data software written in LabVIEW may enable new algorithms to be tested and validated with a short turnaround time. The various embodiments of airborne Doppler wind LIDAR data software written in LabVIEW may enable archiving of data at user-selectable altitudes over a long observation period for data distribution and population. As an example, a "slice and save" feature may enable users to archive a wind profile at user-selectable altitudes over a long observation period for data distribution and population.

Errors in airborne Doppler wind LIDAR data may result from misalignment of wind LIDAR instruments and inaccurate instrument data. The various embodiments of airborne Doppler wind LIDAR data software written in LabVIEW may enable analysis of wind LIDAR data with high precision while compensating for instrument misalignment errors and measurement errors.

In an alternate embodiment, various functionality discussed herein may be provided in C or MATLAB software environments, but the C or MATLAB software environments may be less preferred embodiments than airborne Doppler wind LIDAR data software written in LabVIEW.

FIG. 1 illustrates an example airborne Doppler Wind LIDAR system suitable for use with the various embodiments. The system may include an airborne Doppler Wind LIDAR system 104, an Inertial Navigation System/Global Positioning System ("INS/GPS") system 106, and a computing device 107, such as a computing device off-board the aircraft 102, that may receive raw data files from the airborne Doppler Wind LIDAR system 104 and INS/GPS system 106. The aircraft 102 may be any type aircraft, such as a DC-8, UC-12B, WB-57, Global Hawk Unmanned Airborne System ("UAS"), etc. The Doppler Wind LIDAR system 104 may be any type Doppler Wind LIDAR system, such as a pulsed 2-Micron Coherent Doppler LIDAR system. The Doppler Wind LIDAR system 104 may transmit and receive pulses of light 114 along one or more line of sight and generate Doppler Wind LIDAR data about aerosols 110 in the atmosphere. The INS/UPS system 106 may receive GPS timing signals from GPS satellites 112, along with other aircraft information, and generate INS/GPS data, such as the aircraft 102 Earth coordinate speed in the east, north, and up direction, inertial measurement unit ("IMU") in meters/second, speed, roll, pitch, and heading angles in degrees, latitude, longitude, altitude, etc. The Doppler Wind LIDAR system 104 and the INS/GPS system 106 may be connected to the computing device 107 by data connections 103 and 105, respectively, and may output data files for each line of sight (or look direction) to the computing device 107 which may be received by the computing device's 107 processor. As an example, for each line of sight along which data may be collected by the Doppler Wind LIDAR system 104, a pair of a raw Doppler Wind LIDAR data file and a INS/GPS data file may be generated and provided to the computing device 107. The data connection 103 and 105 may be any type data connections, such as wired or wireless data connections and may be established while the aircraft 102 is in flight and on mission or when the aircraft has landed. Alternatively, the data connections 103 and 105 may be established using physical transport media, such as CD-ROMS or FLASH drives including the raw Doppler Wind LIDAR data files and a INS/GPS data files that may be transported from the aircraft 102 and connected to the computing device 107. The Doppler Wind LIDAR data file may include LIDAR return data. The INS/GPS data file may include IMU data, such as aircraft 102 speed in meters per second in the Earth coordinate east, north, and up directions, IMU speed, roll, pitch, and heading angles in degrees, longitude, latitude, and altitude. A processor of the computing device 107 may be configured with airborne Doppler wind LIDAR data software written in LabVIEW to process the Doppler Wind LIDAR data files and INS/GPS data files using various algorithms, such as APOLO and/or the five direction based algorithm, to generate wind profile parameters and display panoramic views of the wind parameter estimates and long haul displays.

Figure 2:
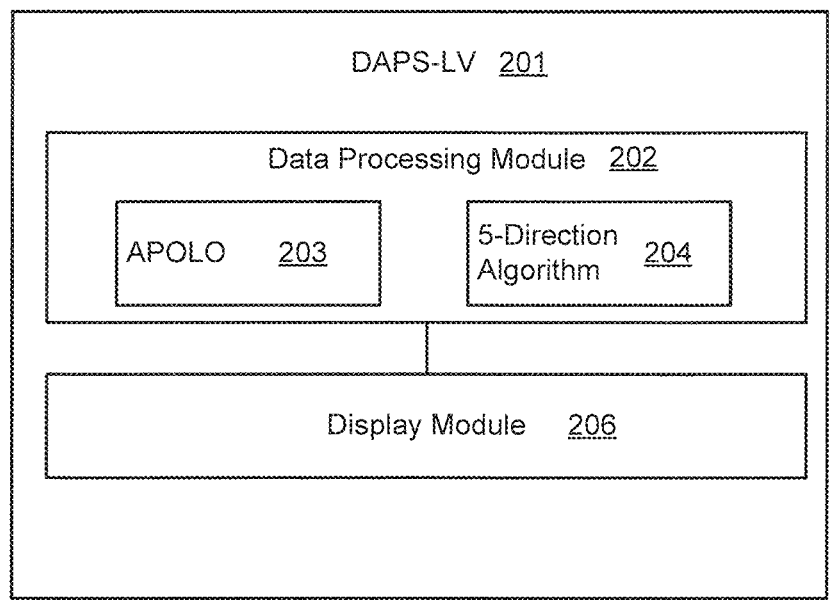
FIG. 2 is a data structure diagram of example modules of Doppler wind LIDAR data software written in LabVIEW according to an embodiment.

FIG. 2 is a data structure diagram illustrating various modules of Doppler wind LIDAR data software written in LabVIEW ("DAPS-LV") 201 according to an embodiment. DAPS-LV 201 may include a data processing module 202 and a display module 206. When DAPS-LV 201 is launched, the data processing module 202 may generate a user input window for display. The user input window may enable a user to enter data processing parameters and options and choose a folder that may include the raw Doppler Wind LIDAR data and INS/GPS data received from one or more previously flown airborne Doppler Wind LIDAR missions. The data processing module 202 may process the raw Doppler Wind LIDAR data and INS/GPS data according to the user entered parameters and options using one or more algorithms available to the data processing module 202, such as APOLO 203, the five direction based algorithm 204, and/or a new user loaded test algorithm, to generate output data files of wind profile data. Additionally, the data processing module 202 may enable dropsonde data for comparison with the wind profile data to be identified. DAPS-LV 201 may also include a display module 206 which may use the output data files of wind profile data to display panoramic views of the wind parameter estimates and long haul displays. Additionally, the display module 206 may receive user input changing the threshold parameters and may update the displayed views based on the changed parameters, thereby enabling the user to visualize the impact of changes. Further, the display module 206 may enable a user to specify and save wind profiling data at a specific altitude, thereby enabling a "slice and save" feature allowing users to archive a wind profile at user-selectable altitudes over a long observation period for data distribution and population.

Figure 3:
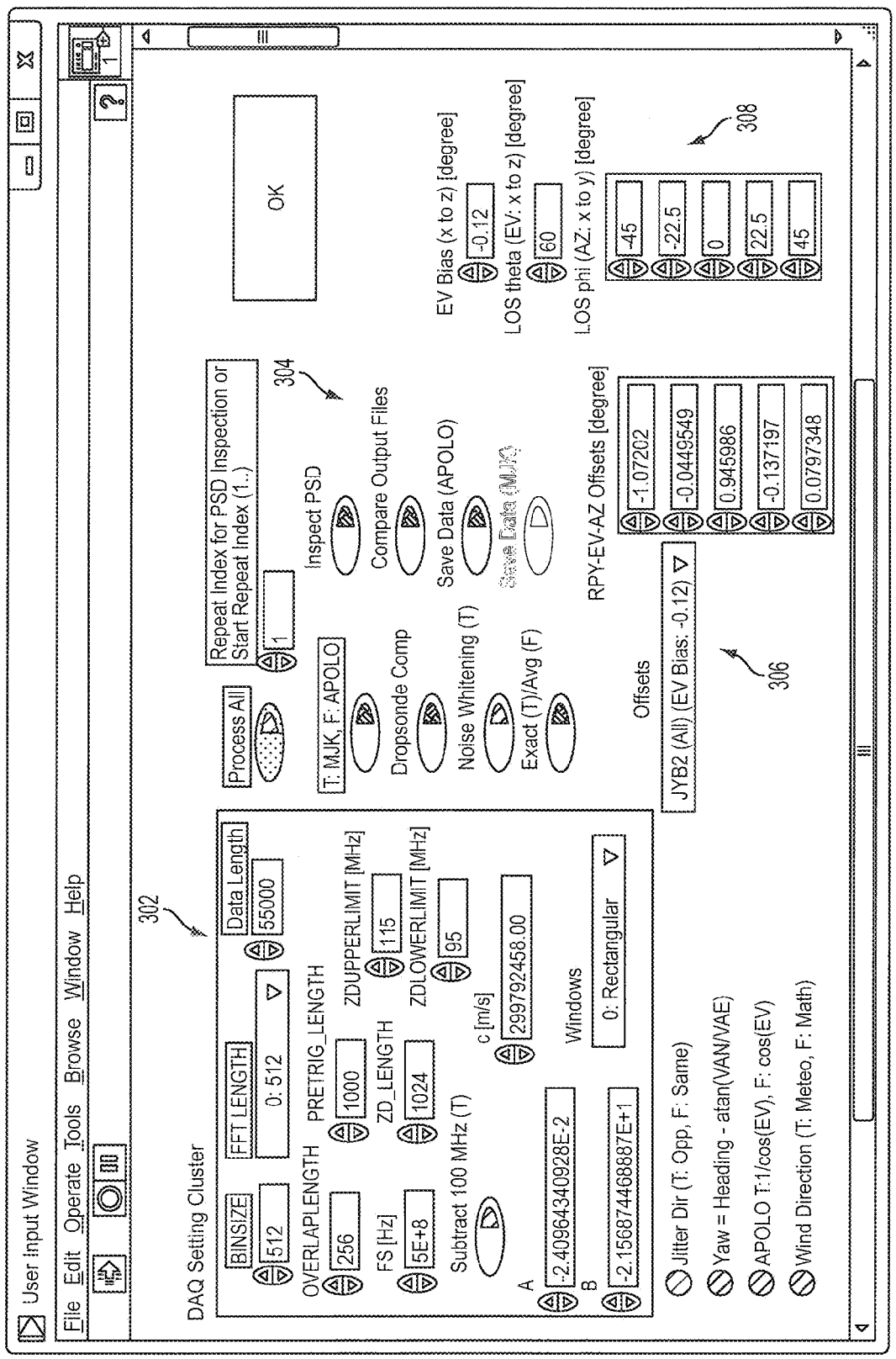
FIG. 3 is a screen shot of an example user input window according to an embodiment.

FIG. 3 is a screen shot of an example user input window according to an embodiment. The user input window may be the main window of the data processing module of DAPS-LV. The user input window may enable users to specify a single set of Doppler Wind LIDAR data and INS/GPS data or the entire data set of Doppler Wind LIDAR data and INS/GPS data in a specified data folder to process. User specific data processing parameters and values may be entered in the user input window. User specific data processing parameters and values may include: data characteristics 302 including Fast Fourier Transform ("FFT") size, bin size, data length, overlap, pre-trigger length, zero Doppler upper and lower limits, frequency shifts, other values, etc.; algorithm and processing selections 304 including the algorithm to use (e.g., APOLO or the five direction based algorithm), a dropsonde comparison selection, noise whitening selection, etc; offset values 306, such as instrument offset angles and biases; and line or sight values 308, such as the line of sight offsets from the aircraft azimuth.

Figure 4:
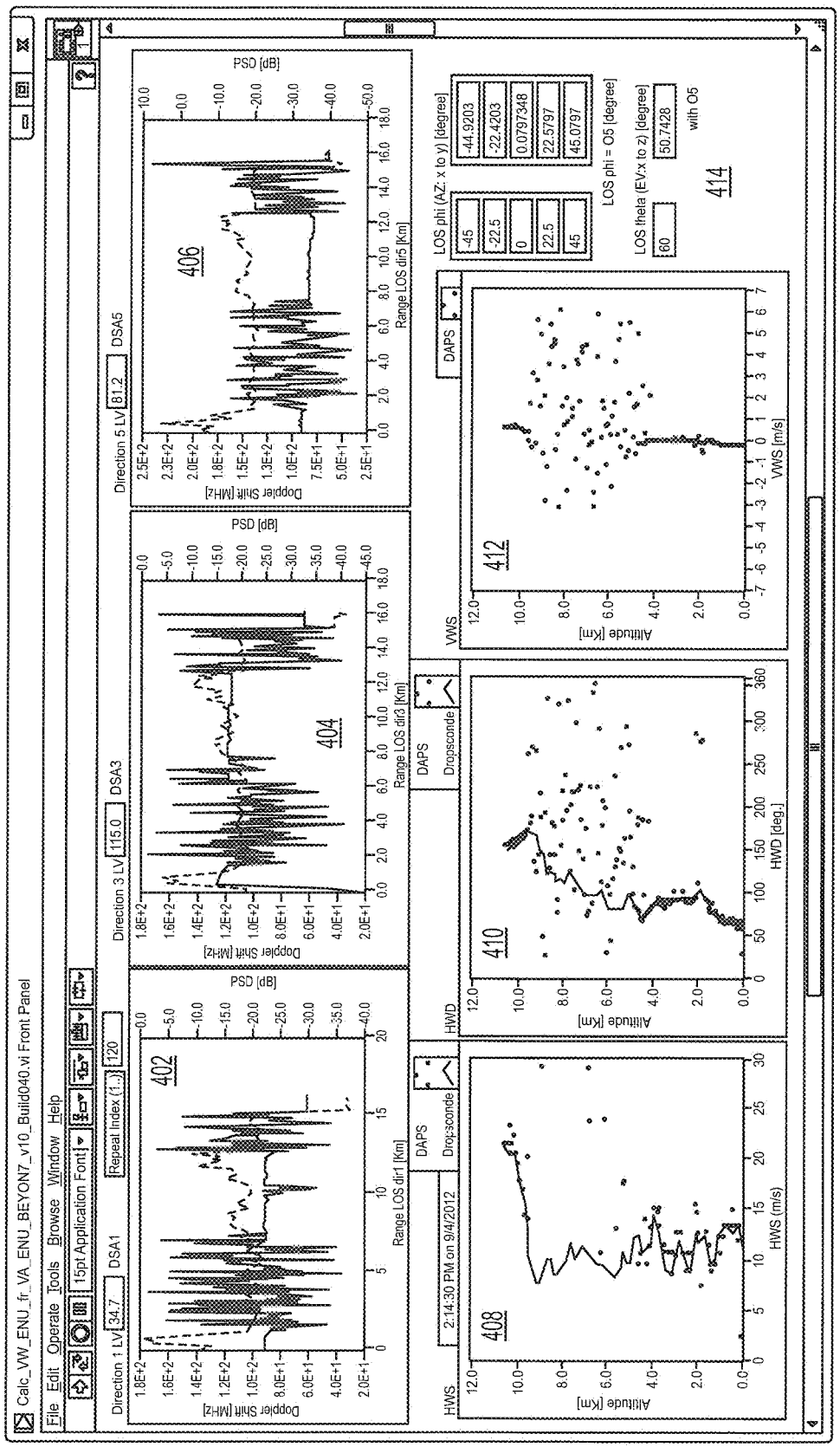
FIG. 4 is a screen shot of an example single-set wind parameter estimate display according to an embodiment.

FIG. 4 is a screen shot of an example single set wind parameter estimate display according to an embodiment. The single-set wind parameter estimate display window may display wind parameter estimates for different algorithms, such as two different algorithms APOLO and the five direction based algorithm. Dropsonde data may also be displayed to enable the comparison and analysis of algorithm results to dropsonde data. Various graphs may be shown as tiles in this view, including graphs 402, 404, and 406 of Doppler Shift and power estimates at different lines of sight, graph 408 of horizontal wind speed computed by the data processing module and horizontal wind speed from dropsonde data, graph 410 of horizontal wind direction computed by the data processing module and horizontal wind direction from dropsonde data, and graph 412 of vertical wind speed computed by the data processing module. Additionally, instrument misalignment compensation inputs 414 may be displayed in the single-set wind parameter estimate display window.

Figure 5:
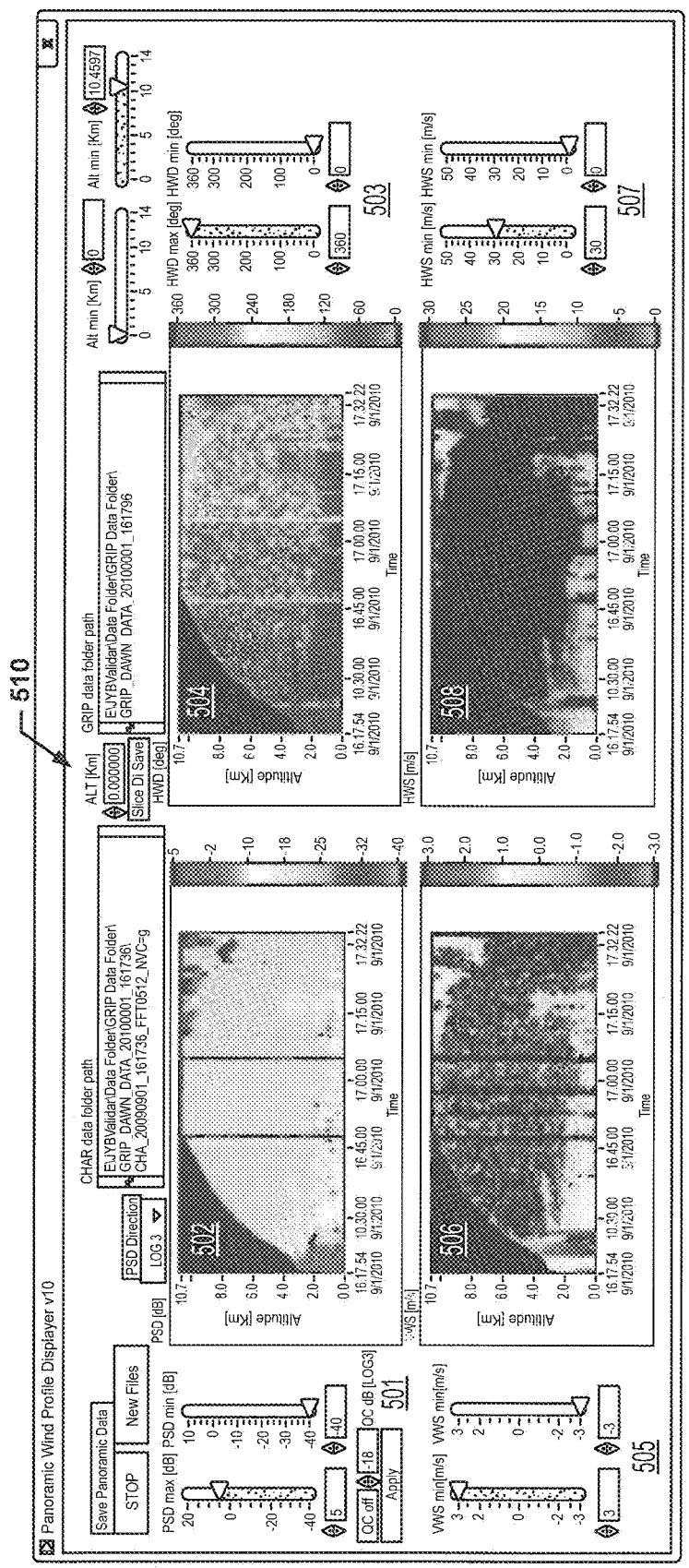
FIG. 5 is a screen shot of an example long haul wind parameter estimate display according to an embodiment.

FIG. 5 is a screen shot of an example long haul wind parameter estimate display according to an embodiment. The long haul wind parameter estimate display window may display long haul color graphs, such as water fall graphs with different colors indicating different values, of the power distribution at each line of sight 502, the horizontal wind direction 504, the vertical wind speed 506, and the horizontal wind speed 508 for the entire observation time span with proper time stamps. The user may also display data in power quality controlled mode enabling a "slice and save" feature which saves the data at user-specified altitudes 510 for data distribution and population purposes. Additionally, threshold parameters may be changed in real time or near real time using sliders 501, 503, 505, and 507 and the resulting changes in the graphs 502, 504, 506, and 508, may be reflected.

Figure 6:
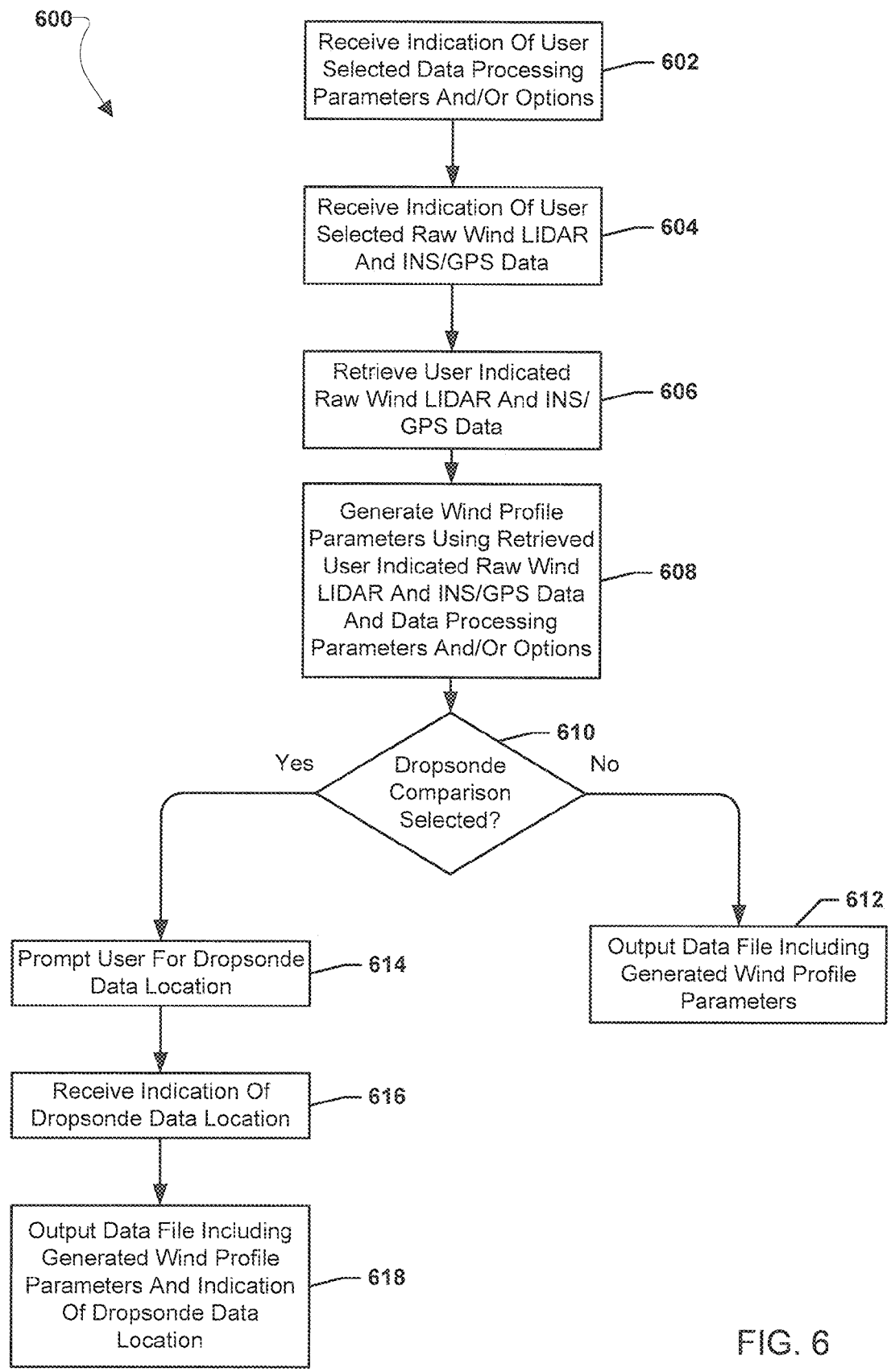
FIG. 6 is a process flow diagram illustrating an embodiment method for generating wind profile parameters in a data processing module of Doppler wind LIDAR data software written in LabVIEW.

FIG. 6 illustrates an embodiment method 600 for generating wind profile parameters in a data processing module of Doppler wind LIDAR data software written in LabVIEW. In an embodiment, the operations of method 600 may be performed by the processor of a computing device executing a data processing module of Doppler wind LIDAR data software. In block 602 the data processing module may receive an indication of user selected data processing parameters and/or options. As an example, the indication of user selected data processing parameters and/or options may be indications of parameters entered by a user and/or radio buttons selected by a user in a user input window as discussed above with reference to FIG. 3. In block 604 the data processing module may receive an indication of user selected raw wind LIDAR data and INS/GPS data. As an example, the indication of user selected raw wind LIDAR data and INS/GPS data may be the address of a folder in a memory available to the computing device in which raw wind LIDAR data and INS/GPS data from past airborne missions are stored. In block 606 the data processing module may retrieve the user indicated raw wind LIDAR data and INS/GPS data and in block 608 may generate wind profile parameters using the retrieved user indicated raw wind LIDAR data and INS/GPS data as well as the user selected data processing parameters and/or options. For example, the data processing module may generate the wind profile using the algorithm or algorithms selected by the user (e.g., APOLO and the five direction based algorithm), the data characteristics, offset values, and line of sight information provided by the user, and the raw wind LIDAR data and INS/GPS data selected by the user to determine horizontal wind speeds, horizontal wind directions, altitudes, vertical wind speeds, power distributions, etc. for the raw wind LIDAR data and INS/GPS data.

In determination block 610 the data processing module may determine whether a dropsonde data comparison is selected. If a dropsonde data comparison is not selected (i.e., determination block 610="No"), in block 612 the data processing module may output one or more data file including the generated wind profile parameters. If a dropsonde data comparison is selected (i.e., determination block 610="Yes"), in block 614 the data processing module may prompt the user for a dropsonde data location, for example by generating a pop up window with a field for the path to the dropsonde data. In block 616 the data processing module may receive the indication of the dropsonde data location. For example the indication may be the address of a folder in a memory available to the computing device in which the dropsonde data is stored. In block 618 the data processing module may output one or more data file including the generated wind profile parameters and the indication of the dropsonde data location.

Figure 7:
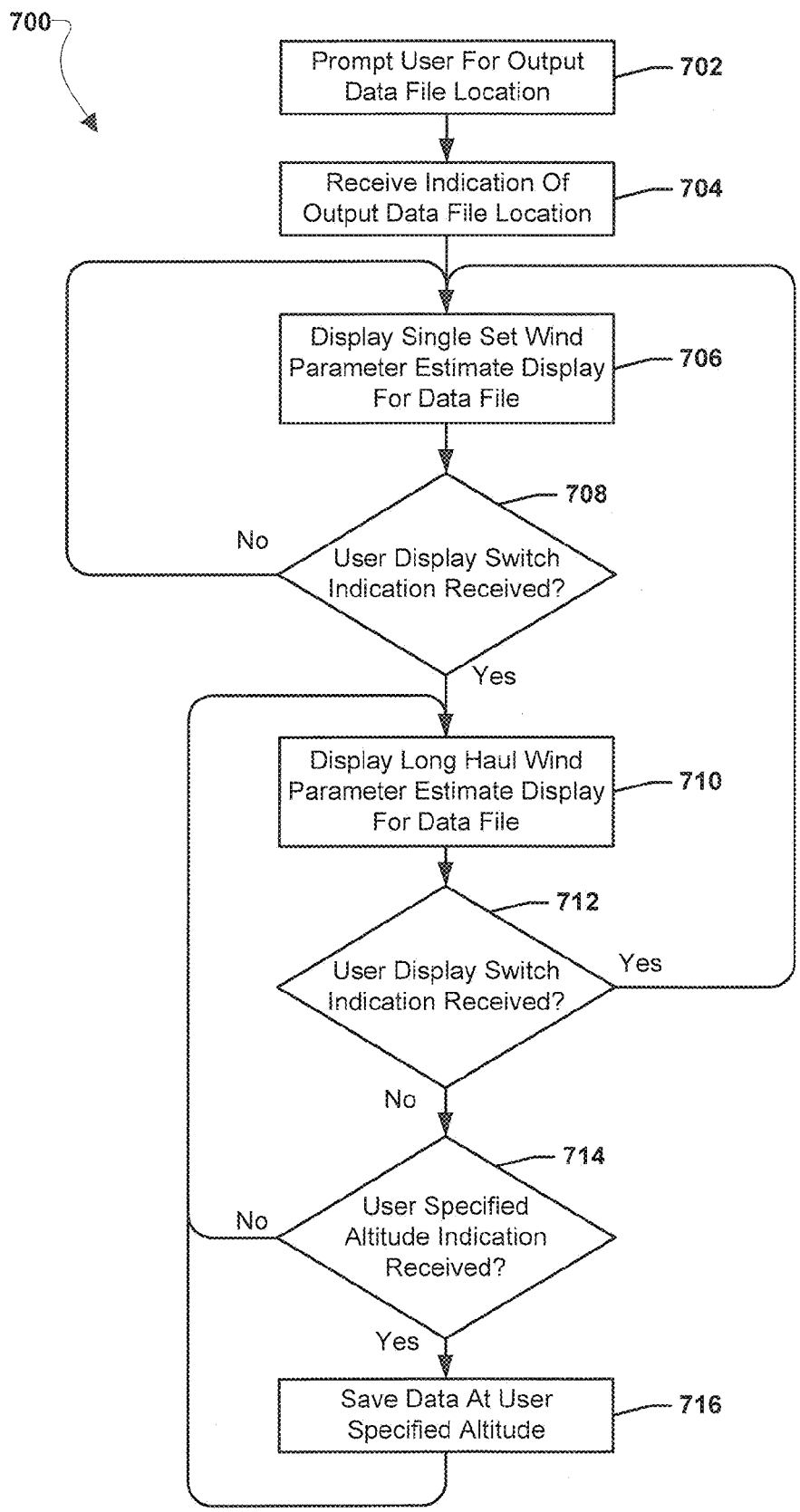
FIG. 7 is a processor flow diagram illustrating an embodiment method for displaying wind parameter data in various views in a data display module of Doppler wind LIDAR data software written in LabVIEW.

FIG. 7 illustrates an embodiment method 700 for displaying wind parameter data in various views in a data display module of Doppler wind LIDAR data software written in LabVIEW. In an embodiment, the operations of method 700 may be performed in conjunction with the operations of method 600 described above with reference to FIG. 6. In an embodiment, the operations of method 700 may be performed by the processor of a computing device executing a display module of Doppler wind LIDAR data software. In block 702 the display module may prompt the user for an output data file location. As an example, the display module may generate a pop up window requesting the pathway to the output data file generated by the data processing module according to method 600. In block 704 the display module may receive an indication of the output data file location. For example the indication may be the address of a folder in a memory available to the computing device in which the output data file is stored. In block 706 the display module may display a single set wind parameter estimate display for the output data file. As an example, the single set wind parameter estimate display may be similar to that discussed above with reference to FIG. 4 and may display wind parameter estimates for different algorithms, such as two different algorithms APOLO and the five direction based algorithm and dropsonde data in various graphs. In block 708 the display module may determine whether a user display switch indication is received. As an example, a user display switch indication may be a user selection of another display view, such as a long haul view. If no switch indication is received (i.e., determination block 708="No"), in block 706 the display module may continue to display the single set wind parameter estimate display.

If a switch indication is received (i.e., determination block 708="Yes"), in block 710 the display module may display a long haul wind parameter estimate display for the output data file. As an example, the long haul wind parameter estimate display window may be similar to that discussed above with reference to FIG. 5 and may display long haul color graphs of the power distribution at each line of sight, the horizontal wind direction, the vertical wind speed, and the horizontal wind speed for the entire observation time span covered by the output data file. In block 712 the display module may determine whether a user display switch indication is received. As an example, a user display switch indication may be a user selection of another display view, such as a single set wind parameter view. If no switch indication is received (i.e., determination block 712="No"), in block 714 the display module may determine whether a user specified altitude indication is received. If no user specified altitude indication is received (i.e., determination block 714 "No"), in block 710 the display module may continue to display the long haul wind parameter estimate display. If a user specified altitude indication is received (i.e., determination block 716="Yes"), in block 716 a "slice and save" feature may be enabled which saves (i.e., archives) the data at the user specified altitude for data distribution and population purposes, and in block 710 the display module may continue to display the long haul wind parameter estimate display. If a switch indication is received (i.e., determination block 712="Yes"), in block 706 the display module may display the single set wind parameter estimate display for the output data file. In this manner, the display module may enable the user to toggle between the single set wind parameter estimate display and the long haul wind parameter estimate display.

Figure 8:
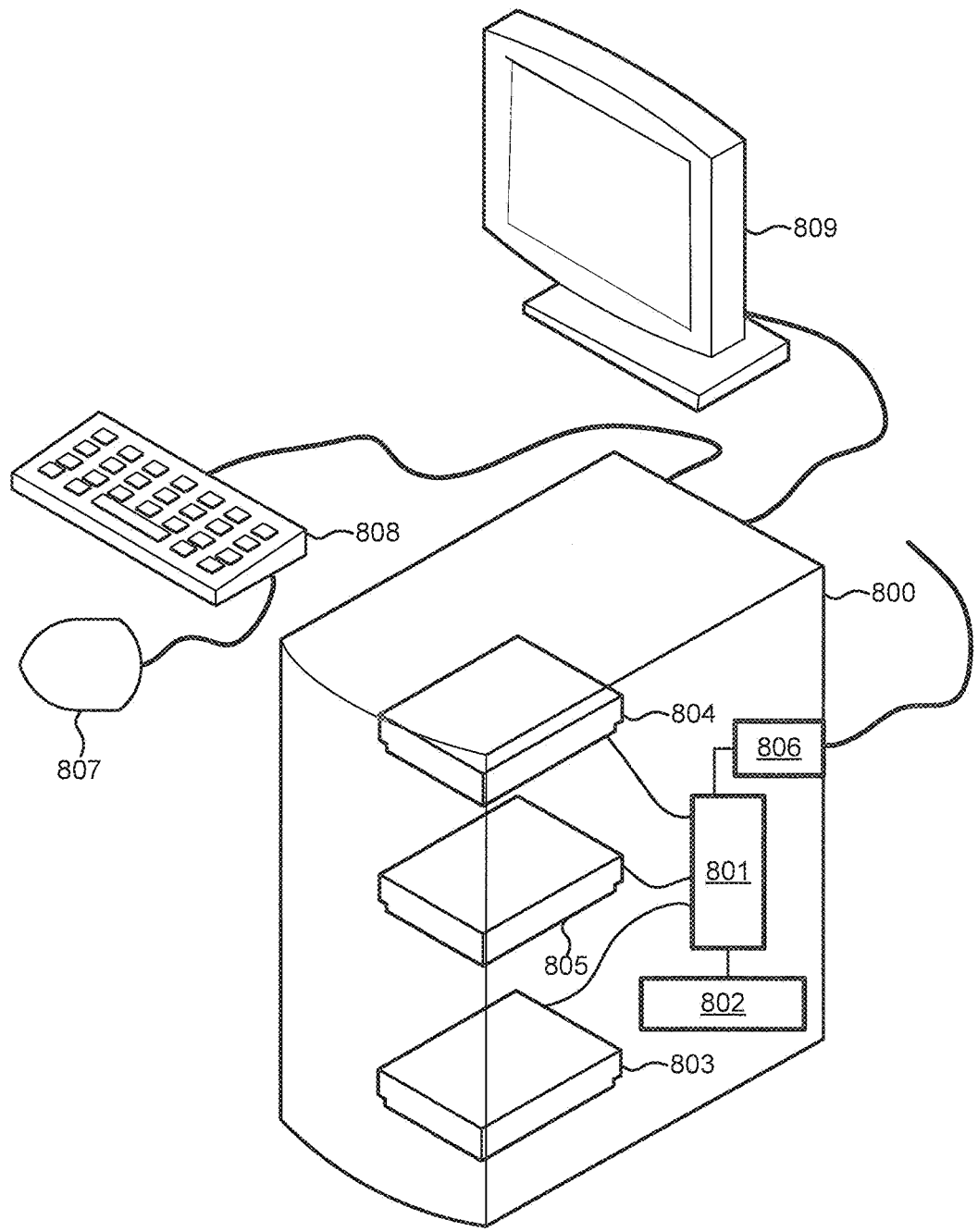
FIG. 8 is a component block diagram of a computing device suitable for use with the various embodiments.

The various embodiments may be implemented in any of a variety of computer devices, an example of which is illustrated in FIG. 8. A computer device 800 will typically include a processor 801 coupled to volatile memory 802 and a large capacity nonvolatile memory, such as a disk drive 805 of Flash memory. The computer device 800 may also include a floppy disc drive 803 and a compact disc (CD) drive 804 coupled to the processor 801. The computer device 800 may also include a number of connector ports 806 coupled to the processor 801 for establishing data connections or receiving external memory devices, such as a USB or FireWire® connector sockets, or other network connection circuits for coupling the processor 801 to a network or bus. The computer device 800 may also include the trackball 807, keyboard 808 and display 809 all coupled to the processor 801.

The processor 801 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 802 and/or 805 before they are accessed and loaded into the processor 801. The processor 801 may include internal memory sufficient to store the application software instructions. In many devices the internal memory may be a volatile or nonvolatile memory, such as flash memory, or a mixture of both. For the purposes of this description, a general reference to memory refers to memory accessible by the processor 801 including internal memory or removable memory plugged into the device and memory within the processor 801 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. An airborne wind profiling method performed by a system comprising a computing device in communication with an airborne Doppler Wind LIDAR system and an INS/GPS system mounted on an aircraft, the computing device comprising a display, a memory, and a processor connected to the display and the memory, the method comprising:
   receiving an indication of user selected data processing parameters;
   receiving airborne Doppler Wind LIDAR data and associated INS/GPS data from the airborne Doppler Wind LIDAR system and the INS/GPS system;
   generating wind profile parameters using the airborne Doppler Wind LIDAR data and associated INS/GPS data and the indication of user selected data processing parameters;
   displaying the wind profile parameters in a single set wind parameter estimate display, wherein displaying the wind profile parameters in a single set wind parameter estimate display comprises displaying graphs of wind parameter estimates made using a two orthogonal direction based algorithm and a five direction based algorithm overlaid with dropsonde data; and
   displaying the wind profile parameters in a long haul wind parameter estimate display.

2. The method of claim 1, wherein:
   the user selected data processing parameters include one or more of data characteristics, an algorithm selection, a dropsonde selection, offset values, and line of sight values; and
   the single set wind parameter estimate display and the long haul wind parameter estimate display are LabVIEW based displays.

3. The method of claim 1, wherein generating wind profile parameters using the airborne Doppler Wind LIDAR data and associated INS/GPS data and the indication of user selected data processing parameters comprises using both the two orthogonal direction based algorithm and the five direction based algorithm to generate the wind profile parameters using the airborne Doppler Wind LIDAR data and associated INS/GPS data and the indication of user selected data processing parameters.

4. The method of claim 3, wherein displaying the wind profile parameters in a long haul wind parameter estimate display comprises displaying color graphs of wind parameter estimates for an entire observation time span.

5. The method of claim 1, further comprising:
   receiving a user indication of an altitude; and
   archiving data for the generated wind profile parameters over an entire observation time span at the user indicated altitude.

6. A system for post processing Doppler wind LIDAR data, the system comprising:
   an aircraft comprising:
      an airborne Doppler Wind LIDAR system; and
      a INS/GPS system; and
   a computing device in communication with the airborne Doppler Wind LIDAR system and the INS/GPS system, the computing device comprising:
      a display;
      a memory; and
      a processor connected to the display and the memory, wherein the processor is configured with processor-executable instructions to perform operations comprising:
         receiving an indication of user selected data processing parameters;
         receiving airborne Doppler Wind LIDAR data and associated INS/GPS data from the airborne Doppler Wind LIDAR system and the INS/GPS system;
         generating wind profile parameters using the airborne Doppler Wind LIDAR data and associated INS/GPS data and the indication of user selected data processing parameters;
         displaying the wind profile parameters in a single set wind parameter estimate on the display, wherein displaying the wind profile parameters in a single set wind parameter estimate on the display comprises displaying graphs of wind parameter estimates made using a two orthogonal direction based algorithm and a five direction based algorithm overlaid with dropsonde data; and displaying the wind profile parameters in a long haul wind parameter estimate on the display.

7. The system of claim 6, wherein:
the user selected data processing parameters include one or more of data characteristics, an algorithm selection, a dropsonde selection, offset values, and line of sight values; and
the single set wind parameter estimate and the long haul wind parameter estimate are LabVIEW based displays.

8. The system of claim 6, wherein the processor is configured with processor-executable instructions to perform operations such that generating wind profile parameters using the airborne Doppler Wind LIDAR data and associated INS/GPS data and the indication of user selected data processing parameters comprises using both the two orthogonal direction based algorithm and the five direction based algorithm to generate the wind profile parameters using the airborne Doppler Wind LIDAR data and associated INS/GPS data and the indication of user selected data processing parameters.

9. The system of claim 6, wherein the processor is configured with processor-executable instructions to perform operations such that displaying the wind profile parameters in a long haul wind parameter estimate on the display comprises displaying color graphs of wind parameter estimates for an entire observation time span.

10. The system of claim 6, wherein the processor is configured with processor-executable instructions to perform operations further comprising:
receiving a user indication of an altitude; and
archiving data for the generated wind profile parameters over an entire observation time span at the user indicated altitude in the memory.

11. A non-transitory processor readable medium having stored thereon processor-executable instructions configured to cause a processor of a computing device in a system comprising an airborne Doppler Wind LIDAR system and an INS/GPS system mounted on an aircraft and in communication with the computing device to perform operations comprising:
receiving an indication of user selected data processing parameters;
receiving airborne Doppler Wind LIDAR data and associated INS/GPS data from the airborne Doppler Wind LIDAR system and the INS/GPS system;
generating wind profile parameters using the airborne Doppler Wind LIDAR data and associated INS/GPS data and the indication of user selected data processing parameters;

displaying the wind profile parameters in a single set wind parameter estimate display, wherein displaying the wind profile parameters in a single set wind parameter estimate display comprises displaying graphs of wind parameter estimates made using a two orthogonal direction based algorithm and a five direction based algorithm overlaid with dropsonde data; and
displaying the wind profile parameters in a long haul wind parameter estimate display.

12. The non-transitory processor readable medium of claim 11, wherein the stored processor-executable instructions are configured to cause the processor to perform operations such that:
the user selected data processing parameters include one or more of data characteristics, an algorithm selection, a dropsonde selection, offset values, and line of sight values; and
the single set wind parameter estimate display and the long haul wind parameter estimate display are LabVIEW based displays.

13. The non-transitory processor readable medium of claim 11, wherein the stored processor-executable instructions are configured to cause the processor to perform operations such that generating wind profile parameters using the airborne Doppler Wind LIDAR data and associated INS/GPS data and the indication of user selected data processing parameters comprises using both the two orthogonal direction based algorithm and the five direction based algorithm to generate the wind profile parameters using the airborne Doppler Wind LIDAR data and associated INS/GPS data and the indication of user selected data processing parameters.

14. The non-transitory processor readable medium of claim 11, wherein the stored processor-executable instructions are configured to cause the processor to perform operations such that displaying the wind profile parameters in a long haul wind parameter estimate display comprises displaying color graphs of wind parameter estimates for an entire observation time span.

15. The non-transitory processor readable medium of claim 11, wherein the stored processor-executable instructions are configured to cause the processor to perform operations further comprising:
receiving a user indication of an altitude; and
archiving data for the generated wind profile parameters over an entire observation time span at the user indicated altitude.

\* \* \* \* \*